United States Patent
Sieger et al.

(10) Patent No.: US 11,999,574 B2
(45) Date of Patent: Jun. 4, 2024

(54) REEL MOTOR WITH CLOSED COOLING CIRCUIT

(71) Applicant: ebm-papst St. Georgen GmbH & Co. KG, St. Georgen (DE)

(72) Inventors: Tobias Sieger, Geisingen (DE); Johannes Fehrenbach, Unterkimach (DE); Jörg Hornberger, Dornstetten-Aach (DE); Markus Flaig, Hardt (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 942 days.

(21) Appl. No.: 16/978,700

(22) PCT Filed: May 16, 2019

(86) PCT No.: PCT/EP2019/062599
§ 371 (c)(1),
(2) Date: Sep. 6, 2020

(87) PCT Pub. No.: WO2019/228819
PCT Pub. Date: Dec. 5, 2019

(65) Prior Publication Data
US 2021/0006126 A1    Jan. 7, 2021

(30) Foreign Application Priority Data

May 30, 2018   (DE) ..................... 10 2018 112 912.2

(51) Int. Cl.
*B65G 23/08*   (2006.01)
*H02K 3/24*    (2006.01)
(Continued)

(52) U.S. Cl.
CPC ............... *B65G 23/08* (2013.01); *H02K 3/24* (2013.01); *H02K 7/1012* (2013.01); *H02K 9/06* (2013.01); *H02K 9/10* (2013.01)

(58) Field of Classification Search
CPC .......... B65G 23/08; B65G 39/02; H02K 3/24; H02K 7/1012; H02K 9/06; H02K 9/10
See application file for complete search history.

(56) References Cited

U.S. PATENT DOCUMENTS 5,524,805 A * 6/1996 Shiba ................... H02K 7/1012
                                                              226/188
7,086,524 B2 * 8/2006 Hayashi ............... H02K 7/1012
                                                              198/780
(Continued)

FOREIGN PATENT DOCUMENTS

DE       102006004421 A1 *  8/2006   ............. B65G 23/08
GB            868661 A   *  5/1961
WO       WO-2008006934 A1    1/2008

OTHER PUBLICATIONS

International Search Report and Written Opinion of the International Searching Authority, issued in PCT/EP2019/062599, dated Aug. 5, 2019; ISA/EP.

*Primary Examiner* — Gene O Crawford
*Assistant Examiner* — Keith R Campbell
(74) *Attorney, Agent, or Firm* — Harness, Dickey & Pierce, P.L.C.

(57) ABSTRACT

A reel motor (1) for a driven conveyor roller has a stator (11) that is surrounded by a stator housing (10). A rotor (12) drives a rotor shaft (13). A tubular external housing (30) runs around the stator housing (10) at a distance in the circumferential direction. A cooling duct (20) is fluidically connected to an interior of the stator housing (10) holding the stator (11). The cooling duct 20 is formed between the external housing (30) and the stator housing (10). An impel- (Continued)

ler wheel (14) is secured to the rotor shaft (13). The impeller wheel generates a cooling air flow (K). The interior of the stator housing (10) and the cooling duct (20) determine a closed cooling circuit. The cooling air flow is guided through the closed cooling circuit.

15 Claims, 1 Drawing Sheet

(51) Int. Cl.
*H02K 7/10* (2006.01)
*H02K 9/06* (2006.01)
*H02K 9/10* (2006.01)

(56) References Cited

U.S. PATENT DOCUMENTS

| | | | | |
|---|---|---|---|---|
| 7,299,915 | B2 * | 11/2007 | El-Ibiary | B65G 23/08 |
| | | | | 198/791 |
| 7,329,215 | B2 * | 2/2008 | Umeda | F16H 57/0415 |
| | | | | 492/46 |
| 8,134,261 | B2 * | 3/2012 | Ikaheimo | H02K 9/10 |
| | | | | 310/58 |
| 9,248,971 | B2 * | 2/2016 | Wolters | B65G 23/23 |
| 2009/0294255 | A1 * | 12/2009 | Szarkowski | B65G 23/08 |
| | | | | 198/788 |

* cited by examiner

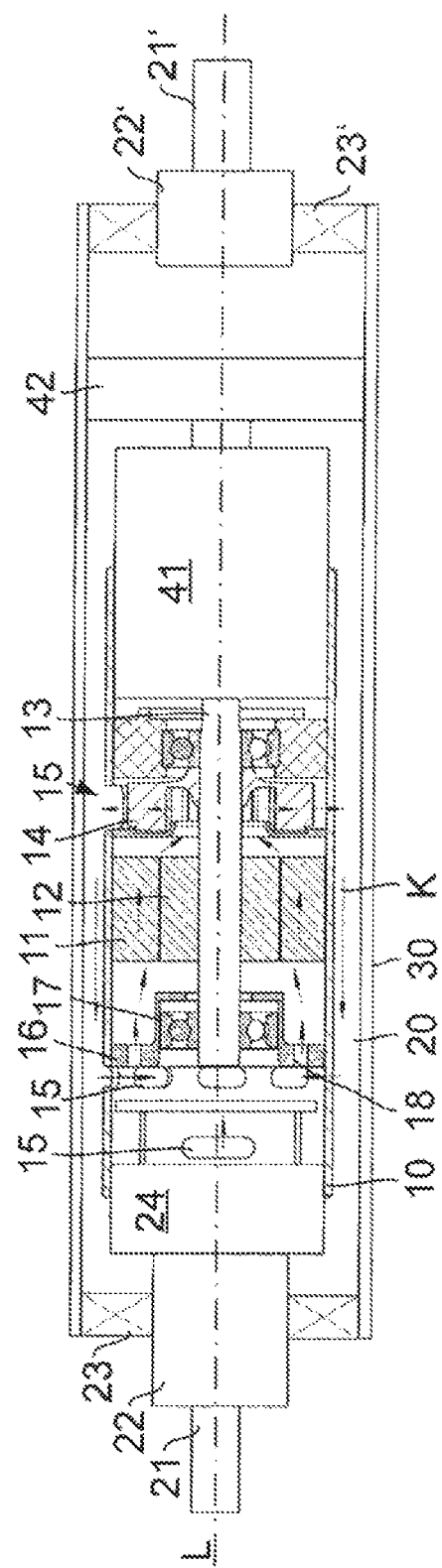

REEL MOTOR WITH CLOSED COOLING CIRCUIT

CROSS-REFERENCE TO RELATED APPLICATIONS

This application is a 371 U.S. National Phase of International Application No. PCT/EP2019/062599, filed May 16, 2019, which claims priority to German Patent Application No. 10 2018 112 912.2, filed May 30, 2018. The entire disclosures of the above applications are incorporated herein by reference.

FIELD

The disclosure relates to a reel motor for a driven conveyor roller and to a conveyor roller with such a reel motor.

BACKGROUND

Various embodiments of driven conveyor rollers are already known from the prior art. They are used in roller conveyor systems. The conveyed material is moved at least over a section of a conveying path by the driven conveyor rollers. The conveyor rollers for the most part are driven via an electric motor that is arranged in the conveyor roller. This enables a compact and protected construction. However, here the heat developed on the electric motor and thus the heat development in the conveyor roller are problematic. In compact conveyor rollers, the drive unit, with the electric motor, is arranged in the roller body of the conveyor roller. The conveyor roller rotates around the drive unit. Between the conveyor roller and the drive unit, an air gap is present. This increases the thermal resistance between the drive unit and the roller body. The larger the air gap, the greater the thermal resistance. Thus, the poorer the heat dissipation. The heat dissipation is additionally worsened by a low roller rotational speed. Thus, by different conveyor speeds, uniform heat dissipation or uniform cooling cannot be ensured. Due to poor heat dissipation or insufficient cooling, the temperature of the drive unit increases. The drive power is worse and the useful life and the efficiency decrease.

Therefore, the solutions known in the prior art, in part, provide for filling an interior of the conveyor roller with oil. This is to dissipate the heat from the electric motor via the oil to a roller body of the conveyor roller. From there, it is dissipated into the environment. Here, it is problematic that the respective interior has to be oil-tight. Thus, an oil leak must be avoided. In addition, the resistances to movement of the moving parts in the conveyor roller are increased by the oil. This leads to a poorer efficiency and a reduced drive power.

Other known solutions provide for increasing the surface of the motor or of the roller body in order to improve the heat dissipation. However, this leads to an increase of the dimensions of the conveyor roller and to the need to accept an enlarged design compared to other solutions. In addition, a purely passive cooling may not be sufficient. This is due to the environmental conditions, such as the environmental temperature or the environmental air flows, can change.

By reducing the distance between the motor and the roller body, a lower thermal resistance between the motor and the environment can, in fact, be achieved. However, here the susceptibility to damage are increased, as well the manufacturing precision necessary for this purpose. If the dimensions are not exactly complied with during manufacturing or if the roller body undergoes minor changes in shape due to an external force, the rotating roller body may grind against a motor housing. Thus, this causes additional heat development and reduced drive power.

If the roller body is of open design, so that the environmental air for cooling can flow directly past the motor, foreign substances and dirt can penetrate into the conveyor roller. The associated soiling results in disadvantageous effects with regard to heat development and wear. Furthermore, due to susceptibility to soiling, the conveyor roller can no longer be used in certain environments with increased requirements for resistance to wear and soiling.

Therefore, the underlying aim of the disclosure is to overcome the aforementioned disadvantages. The aim is to provide a robust and resistant conveyor roller, wherein the heat developed on the electric motor can be dissipated efficiently.

This aim is achieved by a reel motor for a driven conveyor roller comprising: a stator surrounded by a stator housing, and a rotor driving a rotor shaft. A tubular external housing runs around the stator housing at a distance in the circumferential direction. A cooling duct is fluidically connected to an interior of the stator housing holding the stator. The cooling duct is formed between the external housing and the stator housing. An impeller wheel is secured to the rotor shaft. The impeller wheel generates a cooling air flow, in the interior of the stator housing. The cooling duct determines a closed cooling circuit through which the cooling air flow is guided.

According to the disclosure, a reel motor is proposed for a driven conveyor roller. The reel motor has a stator surrounded by a stator housing. A rotor drives a rotor shaft. Furthermore, the reel motor has a tubular external housing and an impeller wheel. The exterior housing runs around the stator housing at a distance in a circumferential direction.

Between the external housing and the stator housing, a cooling duct is formed. The cooling duct is fluidically connected to an interior of the stator housing accommodating the stator. The impeller wheel is secured to the rotor shaft. It is designed to generate a cooling air flow. The interior of the stator housing and the cooling duct determine a closed cooling circuit. The cooling air flow is guided through the circuit.

The external housing of the reel motor is formed either by a housing element of the reel motor or by the roller body of the conveyor roller. The roller body is the rotating part where the material to be conveyed lies and is moved by the rotation. The cooling duct located between the stator housing and the external housing determines an air gap. This enables the rotation of the external housing or of the roller body of the conveyor roller with respect to the stator housing.

The cooling air flow, generated via the impeller wheel, dissipates heat from the stator of the reel motor. The air flow is guided into the cooling duct. From the cooling duct, the heat, in turn, is dissipated to the external housing. From there, the heat is dissipated into the environment of the reel motor. The cooling air flow heated in the stator housing by the stator is thus cooled before it enters the stator housing again. The cooling air flow is guided, via the stator housing and the external housing, without any connection with the environment being present. Thus, a closed cooling circuit is established. Thus, neither foreign bodies nor soiling particles can penetrate into the cooling circuit. At the same time, due to the closed cooling circuit, an active cooling of the stator is implemented. Via active cooling, the temperature of the motor is also kept at low rotational speeds. Thus, the power output of the motor is not influenced, even at low rotational speeds, by the temperature existing on the motor. The cooling of the motor is independent of speed.

The stator housing, the external housing and the cooling duct, arranged between them, are each preferably of tubular design.

Due to the closed cooling circuit, the external housing can be sealed with respect to the environment against the penetration of foreign bodies and fluids. Due to the sealing, a high degree of protection or high IP protection class can be achieved on the reel motor.

In an embodiment variant, the motor is designed as a brushless direct current motor (electronically commutated motor, abbreviated EC motor). The rotor is equipped with permanent magnets. The rotor is actuated by a suitable circuit so that a rotating magnetic field is generated on the stator. Thus, the rotor is rotated. The circuit or operating electronics necessary for the actuation is here preferably integrated directly in the reel motor. The motor electronics, with the circuit or the operating electronics can be integrated, for example, in a securing section. Thus, the stator housing is secured with respect to a frame of the conveyor device.

Alternatively to an internal rotor, if a brushless direct current motor is used, an external rotor can also be used. Here, the rotor surrounds the stator and rotates around the stator. In such an embodiment, the rotor is preferably surrounded by a bushing that is concentrically connected to the rotor shaft or forms the rotor shaft as a tubular hollow component.

In an advantageous development, that the stator housing, along its axial longitudinal direction, has two external sections and, lying axially in between, a directly adjoining middle section. The stator and the rotor are arranged in the middle section. In the external sections of the stator housing, respective openings leading to the cooling duct are provided. This establishes a fluidic connection with the cooling duct. The cooling air flow comes through the openings from the cooling duct on an external marginal section into the stator housing. The air flow is guided past the stator in the middle section or through the stator and is blown out at the respective other external marginal section through the openings from the stator housing into the cooling duct.

In another advantageous variant embodiment, the openings extend in the radial direction. The cooling air flow, upon exiting the stator housing, is conveyed by the impeller wheel directly against the external housing. The heat is released directly onto the external housing and not, for example onto bearings or sealing elements. The elements are arranged before and after the stator housing. In addition, with a radial blow-out direction from the openings into the cooling duct, the cooling air flow only needs to be deflected by 90°.

In axial external marginal sections of the stator housing a plurality of radial openings is preferably provided in each case. The openings are evenly spaced from one another in a circumferential direction. Here, the openings can be arranged in one or in both axial external marginal sections as well as in multiple planes spaced apart from one another in the axial direction.

In an advantageous variant of the disclosure, the impeller wheel is on the rotor shaft in an area facing the openings. Here, the impeller wheel is designed to convey air or the cooling air flow through the openings out of the stator housing into the cooling duct and out of the cooling duct into the stator housing. The air is blown by the impeller wheel into the cooling duct and at the same time suctioned from the cooling duct into the stator housing. Thus, in each case, a circulating air flow forms within the closed cooling circuit.

In an alternative embodiment, in each case, an impeller wheel is provided in each external marginal section of the stator housing. The two impeller wheels are connected to the rotor shaft. One impeller wheel suctions air through the respective openings in its external marginal section out of the cooling duct into the stator housing. The other impeller wheel blows air through the respective openings in its external marginal section out of the stator housing into the cooling duct.

In a design variant, in order to prevent extraneous air or dirt from penetrating into the reel motor and the cooling circuit, the external housing or the roller body of the conveyor roller are sealed with respect to the environment by at least one sealing element. The sealing element is preferably arranged on a marginal section in the axial direction of the external housing. Here, for example, shaft seal rings or labyrinth seals can be used as sealing elements.

The reel motor is preferably fastened on a frame of a conveyor device. This prevents uncontrolled rotation of the stator. For this purpose, an advantageous development of the reel motor provides that the stator housing is secured on an axle that extends axially out of the external housing. This axle is furthermore arranged concentrically with respect to the rotor shaft. The external housing is preferably supported via a bearing on the axle. The external housing is mounted rotatably with respect to the axle. For example, the sealing element can be a shaft seal ring arranged between the external housing and the axle. The external housing can be rotated by a bearing around the axle. Accordingly, it is sealed at the same time by the sealing element. On a section extending out of the external housing, the axle can be rotatably fastened on the conveyor device. This secures the stator with respect to the conveyor device.

The external housing or the roller body of the conveyor roller is driven by the rotor. Thus, in an advantageous development, the external housing is connected, for example, via a flange to the rotor shaft.

For this purpose, the rotor shaft is arranged concentrically with respect to the external housing. The flange or another intermediate piece connects the rotor shaft to the external housing. The rotation of the rotor shaft is thus transmitted directly to the external housing or to the roller body of the conveyor roller. Thus, the rotor shaft and the external housing or the roller body of the conveyor roller can be driven by the rotor around the rotation axis of the rotor shaft.

Alternatively to a direct connection of the rotor shaft to the external housing, the reel motor includes a gearbox. The external housing is connected, via the gearbox, to the rotor shaft. Preferably, the input flange and the output shaft of the gearbox are arranged concentrically with respect to the rotor shaft and to the external housing. In one design, the rotor shaft is connected to the input flange on the input side of the gearbox. The output shaft, in turn, is connected via a flange or another intermediate element to the external housing. A planetary transmission is used as a gearbox variant In a compactly designed embodiment variant, the impeller wheel, viewed in the axial direction, is arranged between the stator and the gearbox.

For an additional, optional gearbox cooling, additional openings can be provided on the stator housing. The openings are formed in particular in a section of the stator housing, that is adjacent to the gearbox. By cooling the gearbox or dissipation of heat from the gearbox, the efficiency of the gearbox can be increased and its wear can be reduced.

Motor electronics for controlling the reel motor is additionally arranged in the stator housing or in the external housing. In particular, the motor electronics is provided on a side of the stator housing that is connected to the axle. The electrical conductors for the power supply of the motor electronics and of the stator and/or rotor are led through the axle into the external housing or into the stator housing. Here, it is advantageous to arrange the motor electronics at least in sections in the area of the closed cooling circuit. In particular, when viewed in the flow direction, the motor electronics are positioned before the stator. Thus, the cooling air flow generated via the impeller wheel has a cooling effect on the motor electronics.

In an additional variant embodiment of the reel motor, the stator includes stator windings that are arranged within the interior of the stator housing. Thus, the cooling air flow runs along the stator windings and/or runs through or between the stator windings. Here, the stator is directly exposed to flow and cooled. The surface of the stator or of the stator windings is directly cooled, without, for example, requiring additional cooling ribs that transmit the heat in the stator housing from the stator to the cooling air flow.

The rotor shaft is mounted in the stator housing rotatably with respect to the stator housing via a bearing plate and a bearing accommodated in the bearing plate. In a likewise advantageous embodiment, the bearing plate has flow passages that determine a portion of the closed cooling circuit. Therefore the bearing plate and thus the bearing are also cooled. Due to a cooling of the bearing, its useful life can be increased.

In addition, in one design, the flow passages of the bearing plate are oriented facing the stator. In a development, the flow passages are designed in the form of nozzles. Thus, the cooling air flow running through the flow passages is directed in a targeted manner onto the stator. As a result the cooling performance can be increased.

In additional variant embodiments, the external housing or the roller body of the conveyor roller has cooling ribs on its internal wall side facing the stator housing. Optionally the stator housing has cooling ribs on its external wall side facing the external housing. If the stator housing forms the cooling ribs, the cooling ribs have a cooling effect on the stator. They lead the heat of the stator via the stator housing to the cooling air flow running in the cooling duct that releases the heat onto the external housing. Alternatively, cooling ribs are advantageously provided on the external housing or the roller body of the conveyor roller. The cooling air flow running through the cooling duct releases its heat to the cooling ribs of the external housing. Thus, the external housing is heated via the cooling ribs, and the heat can radiate into the environment. The cooling ribs can extend in axial direction or be designed in the form of screws around the rotation axis of the external housing. Additional conveying action of the cooling air flow can be brought about by the extension of the cooling ribs along the external wall side of the external housing facing the stator housing.

In an additional advantageous design variant provides that the external housing or the roller body of the conveyor roller has guide elements. The guide elements guide the cooling air flow on its internal wall side facing the stator housing. Optionally, the stator housing has guide elements on its external wall side facing the external housing. In one design, the guide elements can form a guide surface in the shape of a quarter of a circle in longitudinal section along the rotation axis. This deflects the cooling air flow from or to the openings in the stator housing. For this purpose, in an exemplary embodiment variant, a guide element is provided on the external wall side of the external housing or of the roller body of the conveyor roller facing the stator housing in an area facing the impeller wheel. If the cooling air flow is blown by the impeller wheel, from the stator housing against the external housing, the cooling air flow is deflected along the guide surface of the guide element. The guide element is in the shape of a quarter of a circle in section, along the guide element by 90° into the cooling duct. In the area of the openings of the stator housing leading into the interior of the stator housing, in one design, one or more guide elements are also arranged. The guide elements guide the cooling air flow from the cooling duct back into the stator housing.

Moreover, as an additional aspect of the disclosure, a conveyor roller with a reel motor according to the disclosure is proposed. The conveyor roller has the cylindrical roller body. The roller body forms the external housing of the reel motor. Alternatively, the roller body can be of tubular design and lie directly on the external housing.

DRAWINGS

The drawings described herein are for illustrative purposes only of selected embodiments and not all possible implementations, and are not intended to limit the scope of the present disclosure.

Other advantageous developments of the disclosure are characterized in the dependent claims or represented below in further detail together with the description of the preferred embodiment of the disclosure in reference to the FIGURE. In the FIGURE:

FIG. 1 is cross section view of a sealed reel motor with a closed cooling circuit.

The embodiment example of the reel motor 1 shown in FIG. 1 includes an axle 21 extending into the external housing 30. The external housing 30 at the same time forms the roller body of the conveyor roller. The axle 21 is oriented concentrically with respect to a longitudinal axis L of the reel motor 1, which is at the same time a rotation axis around which the external housing 30 and the rotor shaft 13 are rotatably mounted. The axle 21, on its side protruding from the external housing 30, can be secured on a frame, not represented, of a conveyor device. The stator housing 10 is arranged in the interior of the external housing 30. The stator housing 10, secured to the axle 21, is secured stationarily and in particular in a rotationally fixed manner with respect to the frame of the conveyor device.

A first bearing unit 23 is arranged between the bearing section 22 and the external housing 30 on a bearing section 22 of the axle 21 or around the bearing section 22. The external housing 30 is rotatably mounted on the axle 21 in a circumferential direction around the longitudinal axis L. The first bearing unit 23 includes both a radial bearing and a sealing element. Thus, the reel motor 1 or the interior of the external housing 30 is sealed against a penetration of foreign bodies and moisture by the bearing unit 23.

On a side of the external housing 30 facing the bearing unit 23, a stub axle 21' is provided concentrically with respect to the longitudinal axis L. The facing side of the external housing 30 can be supported on the frame of the conveyor device by the stub axle 12'. The stub axle 21' also has a bearing section 22'. A second bearing unit 23' with a radial bearing and a sealing element is arranged on the bearing section 22'. The bearing unit 23', arranged between the external housing 30 and the bearing section 22' of the stub axle 21', supports the external housing 30 on the side of the stub axle 21'. It is rotatably mounted around the stub axle or around the longitudinal axis L.

The first bearing unit 23 or the second bearing unit 23' can furthermore also comprise an axial bearing that is not shown.

In the axial direction along the longitudinal axis L, a securing section 24 of the axle 21 immediately adjoins the bearing section 22. The stator housing 10 is secured to section 24 by one of its external sections. Openings 15 are arranged in two planes, spaced from one another, in the axial direction along the longitudinal axis L in the external section of the stator housing. A bearing plate 16 is arranged adjoining the external section in the stator housing 10. The rotor shaft 13 is mounted rotatably around the longitudinal axis L on the bearing plate 16 by means of a bearing 17. Furthermore, the bearing plate 16 provides multiple flow passages 18. Flow passages 18 in the form of nozzles fluidically connect the external section. The stator housing 10 is connected on the securing section 24, to the middle section of the stator housing 10.

In the middle section of the stator housing 10, the stator 11, with windings, is arranged. Here, the stator 11 is accommodated by the stator housing 10. It is secured in the stator housing. The stator 11 turns the rotor 12, which is secured on the rotor shaft 13, in the circumferential direction around the longitudinal axis L.

The impeller wheel 14 is secured on the rotor shaft 13, on a side facing away from the bearing plate 16. The impeller wheel 14 is driven by rotation of the rotor shaft 13. The section of the stator housing 10 facing the impeller wheel 14, when viewed in radial direction from the longitudinal axis L, forms the second external section of the stator housing 10. Openings 15 are also arranged in the second external section.

A gearbox 41 is additionally arranged in the stator housing 10 and connected to it in the second external section of the stator housing 10. The gearbox 41 is connected on the input side to the rotor shaft 13 and is driven by the rotor shaft. On the output side, the gearbox 41 or an output shaft of the gearbox 41 is connected via an intermediate piece 42 to the external housing 30. By rotation of the rotor 12 or the rotor shaft 13 connected to the rotor, the impeller wheel 14, and at the same time, via the gearbox 41 as well as the intermediate piece 42, the external housing 30 can be rotated.

In order to enable frictionless rotation of the external housing 30 around the stator housing 10, they are spaced from one another. An air gap is formed between the housings. The air gap determines the cooling duct 20 that extends at least between the openings 15 of the external sections of the stator housing 10 and over the middle section of the stator housing 10.

In the represented embodiment example, the impeller wheel 14 is a radial impeller wheel that suctions air from the middle section of the stator housing 10 and blows it in the radial direction through the openings 15 into the cooling duct 20. The air is suctioned by the impeller wheel 14 from the middle section of the stator housing 10. The stator housing is airtight in the radial direction in the middle section. Thus, air is suctioned from the external marginal section of the stator housing 10 on the side of the securing section 24 and suctioned through the openings 15 arranged there from the cooling duct 20. In the cooling duct 20, an air flow forms from the openings 15 arranged on the impeller wheel 14 to the openings 15 spaced apart along the longitudinal axis L. The air flow in the cooling circuit or the cooling air flow K, is indicated by arrows along the flow path, is driven by the impeller wheel 14 through the stator 11. In the process, it takes up heat from the stator 11 and runs along through the cooling duct 20 on the external housing 30. The heat taken up on the stator 11 is released onto the external housing 30. Thus, the cooling air flow K heated on the stator 11 is cooled again on its way through the cooling duct 20. This is before it is suctioned again into the stator housing 10 through the openings 15 on the side of the securing section 24. The external housing 30 releases the heat transmitted by the cooling air flow K to the environment. This results in the formation of a closed cooling circuit that is isolated from the environment.

In or on the securing section 24, motor electronics can in addition be accommodated. The cooling air flow K can be guided past the motor electronics in a targeted manner in order to also cool the motor electronics at the same time in addition to the stator.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A reel motor for a driven conveyor roller comprising:
   a stator surrounded by a stator housing and a rotor driving a rotor shaft;
   a tubular external housing runs around the stator housing at a distance in the circumferential direction;
   a cooling duct, is fluidically connected to an interior of the stator housing holding the stator, the cooling duct is formed between the external housing and the stator housing; and
   an impeller wheel is secured to the rotor shaft, the impeller wheel generates a cooling air flow, the interior of the stator housing and the cooling duct determine a closed cooling circuit through which the cooling air flow is guided.

2. The reel motor according to claim 1, wherein
   the stator housing, along its axial longitudinal direction, has two external sections and, lying axially in between, a directly adjoining middle section,
   the stator and the rotor are arranged in the middle section, and,
   in the external sections of the stator housing, respective openings leading to the cooling duct are provided for the fluidic connection.

3. The reel motor according to claim 2, wherein
   the openings extend in the radial direction.

4. The reel motor according to claim 2, wherein
   the impeller wheel is provided on the rotor shaft in an area facing the openings and is designed to conveys air through the openings from the stator housing into the cooling duct or from the cooling duct into the stator housing.

5. The reel motor according to claim 1, wherein
   the external housing is sealed off with respect to the environment by at least one sealing element.

6. The reel motor according to claim 1, wherein
   the stator housing is secured on an axle extending axially out of the external housing and arranged concentrically with respect to the rotor shaft, and the external housing is rotatably mounted with respect to the axle.

7. The reel motor according to claim 1, wherein the external housing is connected to the rotor shaft.

8. The reel motor according to claim 7, further comprising a gearbox,
the external housing is connected via the gearbox to the rotor shaft.

9. The reel motor according to claim 8, wherein, when viewed in the axial direction, the impeller wheel is arranged between the stator and the gearbox.

10. The reel motor according to claim 1, wherein the stator comprises stator windings that are arranged in the interior of the stator housing, so that the cooling air flow runs through along the stator windings and/or between the stator windings.

11. The reel motor according to claim 1, wherein the rotor shaft is mounted in the stator housing rotatably with respect to the stator housing via a bearing plate and a bearing accommodated in the bearing plate, and the bearing plate has flow passages which determine a portion of the closed cooling circuit.

12. The reel motor according to claim 11 wherein the flow passages of the bearing plate are oriented facing the stator and/or designed in the form of nozzles.

13. The reel motor according to claim 1, wherein the external housing has cooling ribs on its internal wall side facing the stator housing or the stator housing has cooling ribs on its external wall side facing the external housing.

14. The reel motor according to claim 1, wherein the external housing has guide elements guiding the cooling air flow on its internal wall side facing the stator housing or the stator housing has guide elements on its external wall side facing the external housing.

15. A conveyor roller with a reel motor according to claim 1, with a cylindrical roller body, wherein the roller body is formed by the external housing of the reel motor.

* * * * *